United States Patent
Herzog et al.

(10) Patent No.: US 10,953,437 B2
(45) Date of Patent: Mar. 23, 2021

(54) SCREENING DEVICE FOR THE GENERATIVE MANUFACTURING OF COMPONENTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Frank Schödel, Kronach (DE)

(73) Assignee: Concept Laser GMBH, Lichtenfels (DE)

( * ) Notice: Subject to any disclaimer, the term of this patent is extended or adjusted under 35 U.S.C. 154(b) by 0 days.

(21) Appl. No.: 16/080,184

(22) PCT Filed: Feb. 2, 2017

(86) PCT No.: PCT/EP2017/052274
§ 371 (c)(1),
(2) Date: Aug. 27, 2018

(87) PCT Pub. No.: WO2017/157567
PCT Pub. Date: Sep. 21, 2017

(65) Prior Publication Data
US 2019/0054501 A1    Feb. 21, 2019

(30) Foreign Application Priority Data
Mar. 18, 2016  (DE) .................... 10 2016 105 094.6

(51) Int. Cl.
*B07B 13/16*     (2006.01)
*B07B 1/46*      (2006.01)
(Continued)

(52) U.S. Cl.
CPC ............ *B07B 1/4609* (2013.01); *B07B 13/16* (2013.01); *B29C 64/153* (2017.08); *B29C 64/35* (2017.08); *B33Y 30/00* (2014.12); *B07B 2201/04* (2013.01)

(58) Field of Classification Search
CPC ......... B29C 64/153; B29C 64/35; B07B 1/28; B07B 1/4609; B07B 13/16; B07B 2201/04; B33Y 30/00
(Continued)

(56) References Cited

U.S. PATENT DOCUMENTS 440,883 A    11/1890  Noble
2,916,142 A * 12/1959  Fontein .................... B07B 1/00
                                                     209/274
(Continued)

FOREIGN PATENT DOCUMENTS

AT            2993 B     12/1900
DE      19937260 A1       2/2001
(Continued)

OTHER PUBLICATIONS

English Translation of WO-2008028443; INV: Frank Herzog; Pub. Date: Mar. 2008 (Year: 2008).*

*Primary Examiner* — Joseph C Rodriguez
(74) *Attorney, Agent, or Firm* — Dority & Manning, P.A.

(57) ABSTRACT

The invention concerns a sieve device for use in a device for generative manufacture of components by means of successive solidification of individual layers of powdered solidifiable construction material by exposure to radiation through sector by sector melting or fusing and binding of the construction material the sieve device is configured at least in sections to be inclined in a way that the construction material after appearance on the sieve slows or is reduced to a lower velocity over the surface of the sieve.

15 Claims, 5 Drawing Sheets

Figure 3:
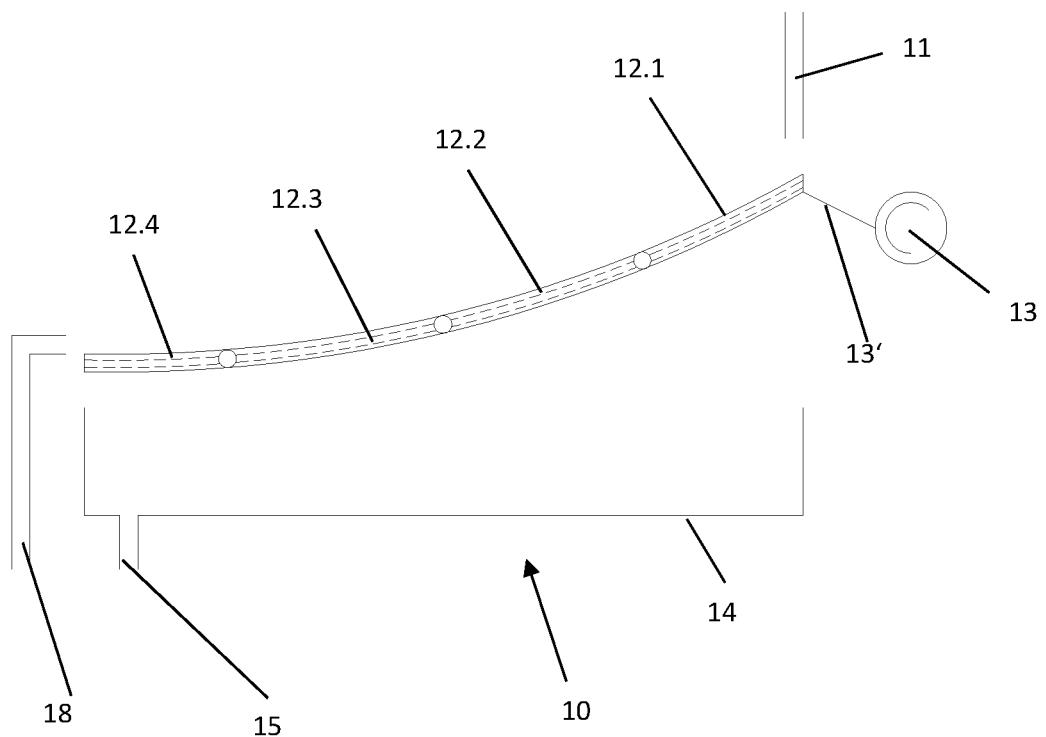

(51) Int. Cl.
*B29C 64/35* (2017.01)
*B33Y 30/00* (2015.01)
*B29C 64/153* (2017.01)

(58) Field of Classification Search
USPC .............................. 209/274, 275, 281, 282
See application file for complete search history.

(56) References Cited

U.S. PATENT DOCUMENTS

| | | | | | |
|---|---|---|---|---|---|
| 3,044,621 | A | * | 7/1962 | Pearlman | ............... B07B 13/10 209/694 |
| 3,232,431 | A | * | 2/1966 | Musschoot | ............... B07B 1/06 209/243 |
| 3,506,123 | A | * | 4/1970 | Ranger | ............... B07B 13/16 209/395 |
| 3,813,298 | A | * | 5/1974 | Chwalek | ............... C08B 30/044 127/69 |
| 3,817,376 | A | * | 6/1974 | Burstlein | ............... B07B 1/282 209/233 |
| 3,835,999 | A | * | 9/1974 | Moore | ............... B01D 35/28 209/251 |
| 3,929,647 | A | | 12/1975 | Kempa | |
| 4,120,790 | A | * | 10/1978 | Tinker | ............... B01D 29/014 210/767 |
| 4,267,037 | A | * | 5/1981 | Merz | ............... B07B 13/10 209/481 |
| 4,696,353 | A | * | 9/1987 | Elmquist | ............... B01D 35/20 175/206 |
| 4,855,039 | A | | 8/1989 | Genev | |
| 5,224,974 | A | * | 7/1993 | Johnson | ............... B05B 14/43 600/453 |
| 5,387,380 | A | * | 2/1995 | Cima | ............... B05C 19/04 264/69 |
| 5,429,247 | A | * | 7/1995 | Lemay | ............... B07B 1/00 209/17 |
| 5,749,471 | A | | 5/1998 | Andersson | |
| 6,142,308 | A | * | 11/2000 | Ghosh | ............... B07B 9/00 209/3 |
| 7,195,121 | B2 | | 3/2007 | Anibas | |
| 7,802,687 | B2 | * | 9/2010 | Fritz | ............... B07B 1/28 209/346 |
| 9,486,962 | B1 | * | 11/2016 | Dugan | ............... B29C 64/20 |
| 9,586,365 | B2 | * | 3/2017 | Chen | ............... B07B 4/00 |
| 2010/0192806 | A1 | * | 8/2010 | Heugel | ............... B29C 64/357 106/286.1 |
| 2018/0065081 | A1 | * | 3/2018 | Herzog | ............... B01D 46/24 |

FOREIGN PATENT DOCUMENTS

| | | | |
|---|---|---|---|
| DE | 102011002954 A1 | 7/2012 | |
| DE | 102011088158 A1 | 6/2013 | |
| EP | 1316408 A1 | 6/2003 | |
| FR | 1021825 A | 2/1953 | |
| GB | 1269423 A | 4/1972 | |
| JP | H02152579 A | 6/1990 | |
| JP | 2001038812 A | 2/2001 | |
| JP | 2005509519 A | 4/2005 | |
| JP | 2013169483 A | 9/2013 | |
| WO | 9426427 A1 | 11/1994 | |
| WO | WO-2008028443 A2 * | 3/2008 | ............ B29C 64/153 |

* cited by examiner

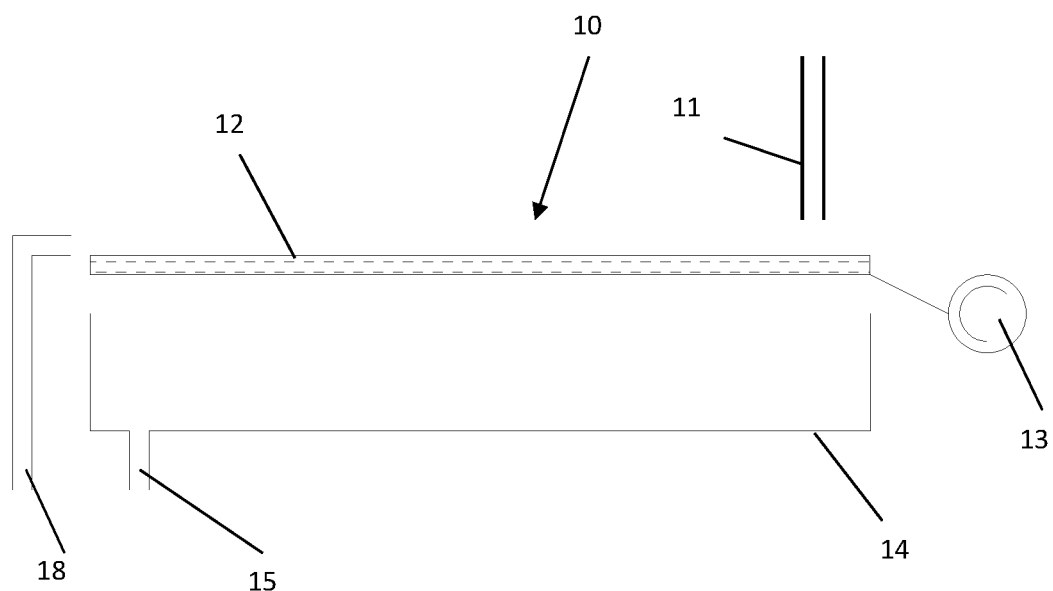
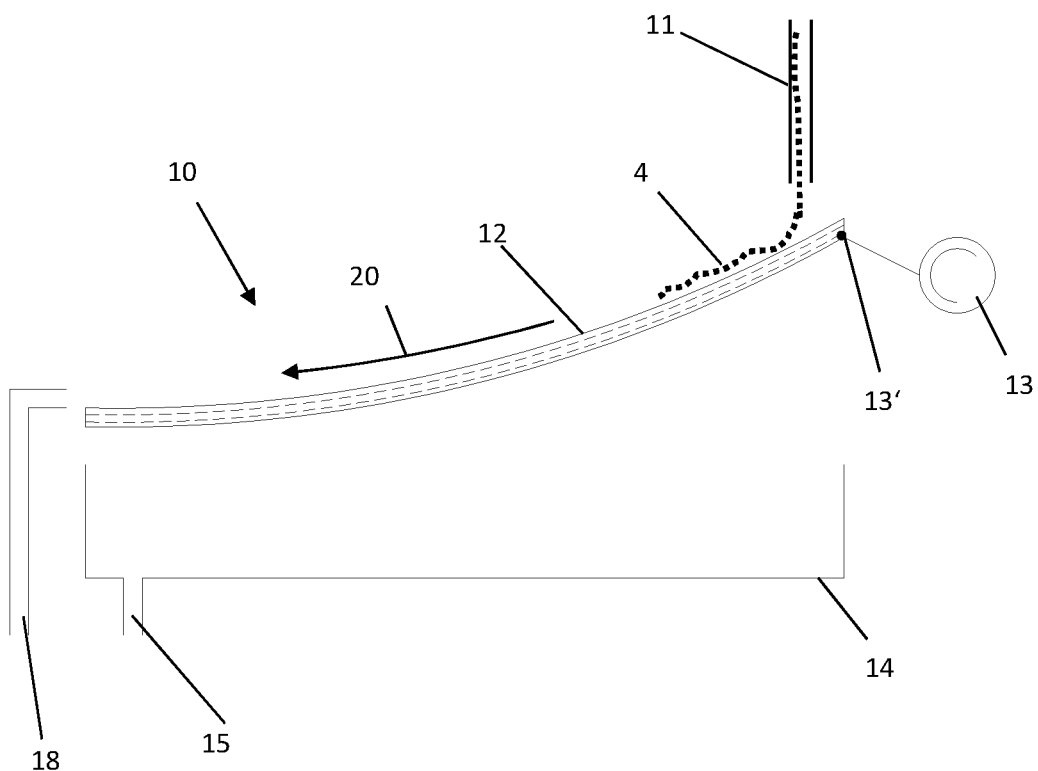
Fig. 1
(State of the Art)
Fig. 2

SCREENING DEVICE FOR THE GENERATIVE MANUFACTURING OF COMPONENTS

CROSS-REFERENCE TO RELATED APPLICATIONS

This application is a United States national stage entry of an International Application serial no. PCT/EP2017/052274 filed Feb. 2, 2017 which claims priority to German Patent Application serial no. 10 2016 105 094.6 filed Mar. 18, 2016. The contents of these applications are incorporated herein by reference in their entirety as if set forth verbatim.

The invention or innovation concerns a sieve device for use in a device for generative manufacture of components by sequential solidification of layers of powdered construction material. Powdered construction material is spread in layers on a base in such generative construction devices and the layers are joined into a solid body by radiation, in particular melted or fused in areas by laser radiation. Known generative construction devices comprise a coating device for application of the powder layers on the carrier, a dosing device for preparing the construction material for the coater, an overflow container for receipt of construction material that is not needed for the coating process, and a sieve device for sieving the construction material that is discharged during the construction process.

Known sieve devices that have up to now been employed in generative construction devices are constructed to be level, i.e. the surface of the sieve is either horizontally oriented or at most slightly inclined so that the grain to be sieved is moved at a steady velocity over the sieve provided that the sieve is, for example, moved by an oscillating drive. If the sieving process is carried out during the construction process, then the sieve is adjusted by means of parameters so that the construction material powder is sieved in a required time. This is detrimental to sieving quality, since a great part of the grain is transferred into the upper grain container. This upper grain fraction must then be sieved again during the setting-up time of the device, in part several times, which is on the one hand inconvenient and on the other hand lengthens the setting-up time. According to the State of the Art, the screening material is sent across the surface of the sieve with constant velocity.

The object of the invention is to specify a sieve device that can be used to special advantage in generative construction devices, through which the entire construction process is accelerated, particularly, however, in that the retrofitting intervals are reduced. This object is solved in that a sieve of the sieve device is configured at least in sections to be inclined in a way that the powder material to be sieved is brought across the surface of the sieve after impinging on it at first with an initial velocity after which the transport speed of the powdered material slows across the surface of the sieve or is reduced to a lower speed.

This is advantageously achieved if the sieve is curved especially in the transport direction of the powder material over the sieve, i.e. in the longitudinal direction of the sieve. It is especially envisaged that the surface of the sieve in the area of a powder feed opening comprises a greater incline than in a powder discharge area of the sieve. The powder discharge area is the area in which the oversized grain is discharged from the surface of the powder.

There are various possibilities as regards the curve in the transport direction of the powder material. The sieve can either comprise an even curve or it can also consist of several sieve sections, for example, angularly bordering on each other or comprising such sieve sections. Each sieve section can either be configured to be level or with a respectively characteristic curve. In addition to the curve in the transport or longitudinal direction of the sieve, it can be provided that the longitudinal side edges of the sieve or sieve section are raised. The sieve sections can, for example, also be connected to be articulated with each other, so that a very flexible adjustment to the total curve of the sieve or of the direction of the sieve is possible. It is advantageously conceivable that the sieve or the sieve sections can be positioned individually to each other and adjusted. The sieve sections must not necessarily be articulated or in another way be fixed. They can also be configured as individual sections, whereby the sieve section areas overlap so that the oversized grain is led from one sieve section to another. It is included in the scope of the invention regarding adjustment that a steep sieve section is first provided onto which the powder material to be sieved is introduced from the powder feed opening. Then a flatter sieve section follows and a steeper sieve section can again follow and so forth. The inclination of the sieve section does not need to reduce to a level surface. The sieve or the sieve sections can jointly or individually or also separately be provided with an oscillating drive. Different oscillations of individual sieve sections can thus be produced and adjusted.

The invention also concerns a device for generative manufacture of components with the above-mentioned characteristics of the preamble of claim 1, in which a sieve device is provided with features according to any one of the claims 1 to 12.

The invention is explained in more detail in the exemplary embodiments in the drawings. The following are shown:

FIG. 1 a sieve device according to the State of the Art,

FIG. 2 a sieve device according to the invention with a continuous sieve evenly curved in the transport direction of the powdered material.

Figure 4:
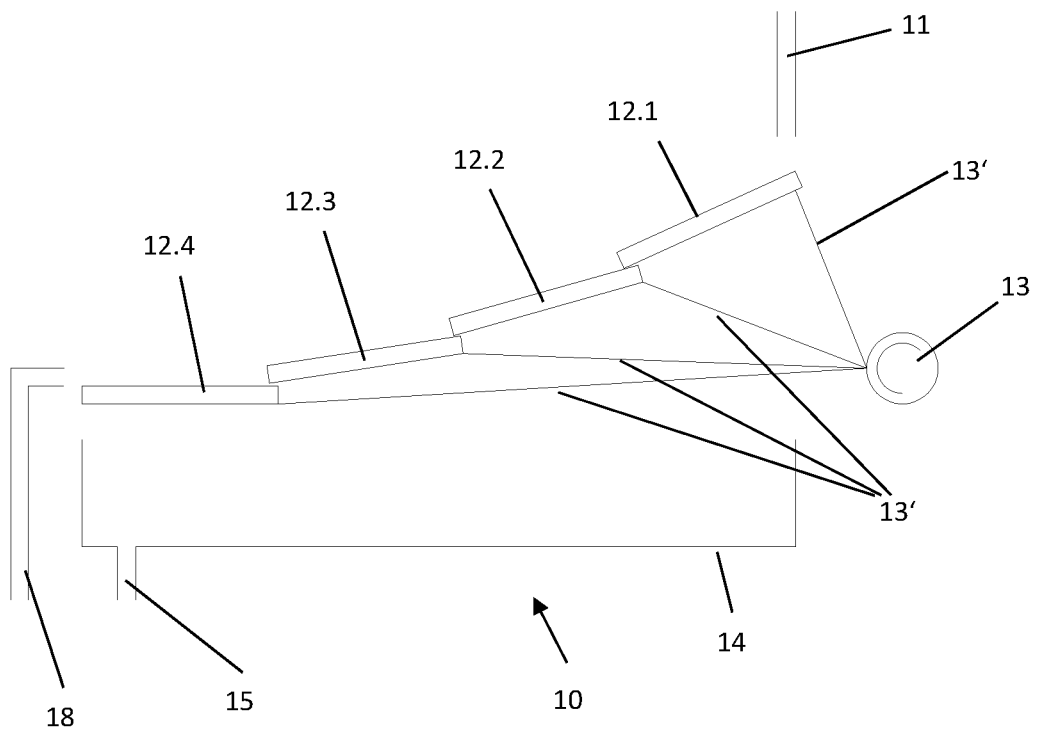
Figure 5:
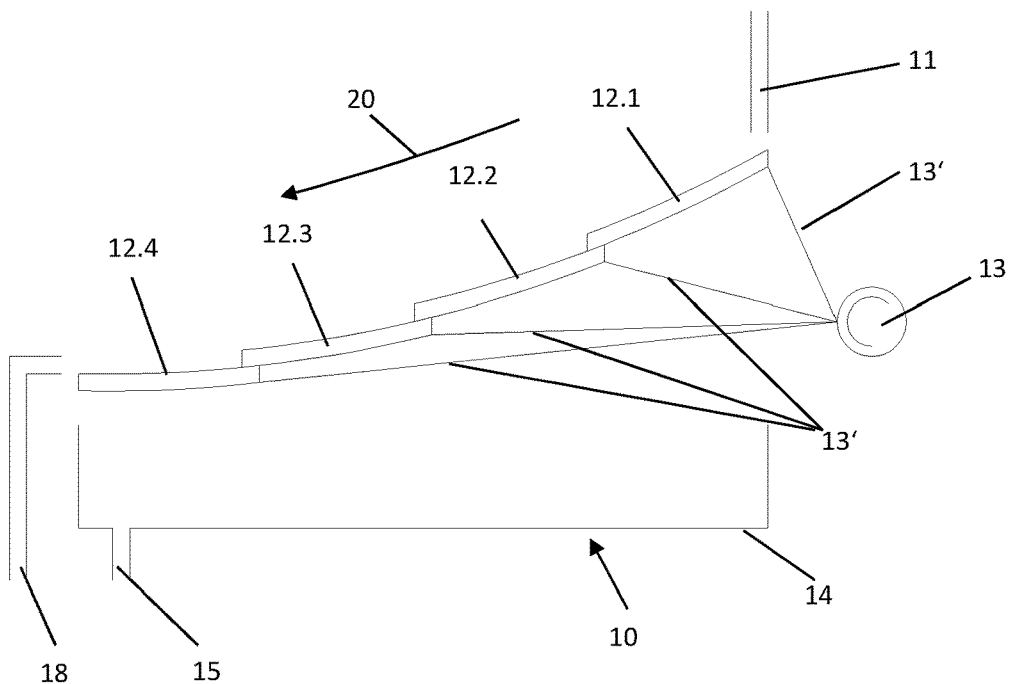
Figure 6:
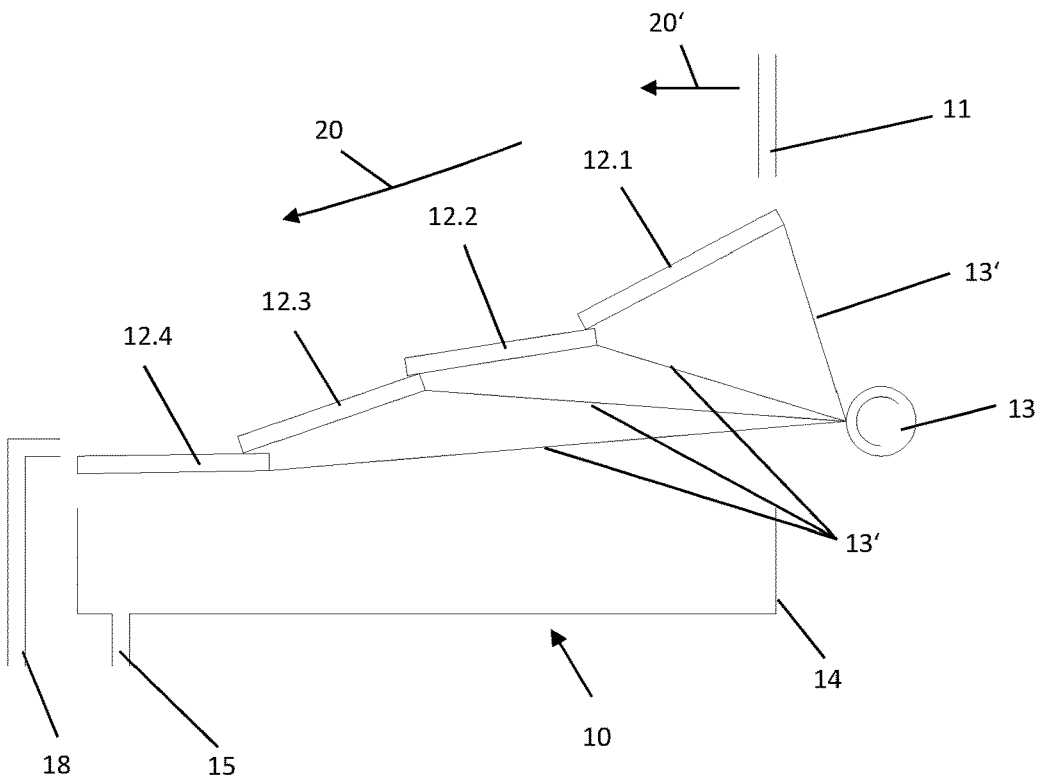
Figure 7:
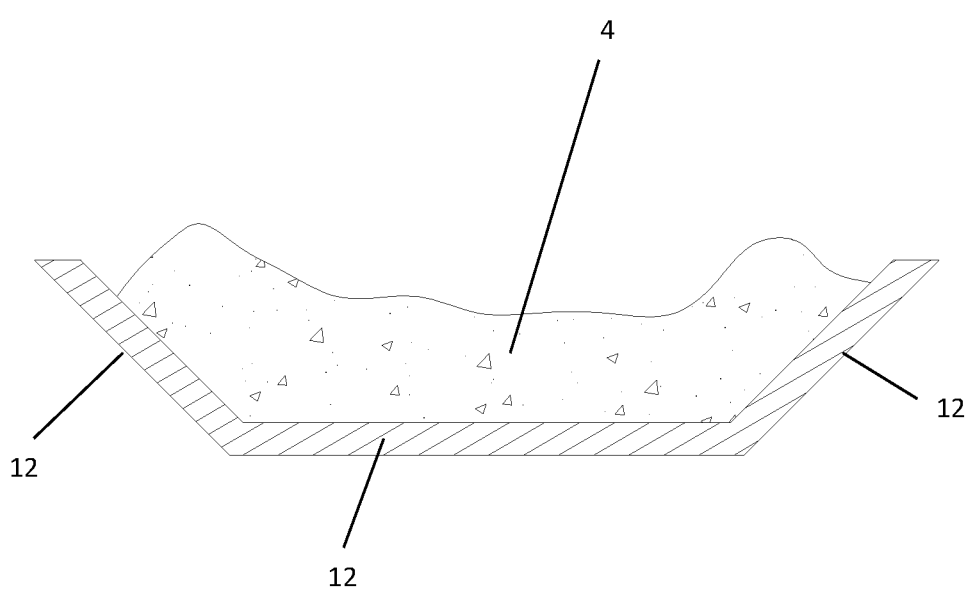
Figure 8:
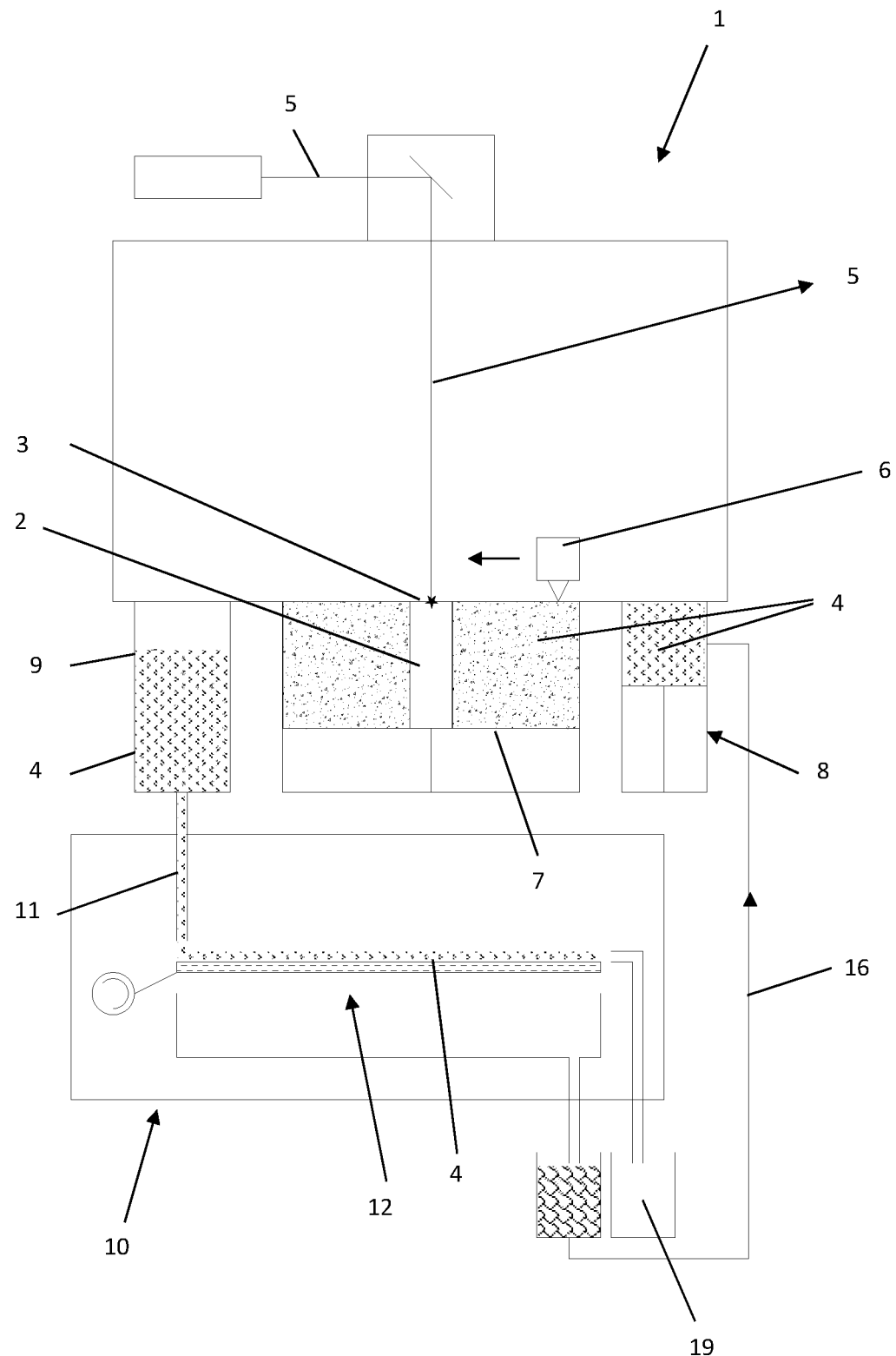

FIG. 3 a sieve device with several level sieve sections that are connected with each other by linking elements, FIG. 4 a sieve device consisting of a number of sieve sections that overlap, FIG. 5 a depiction according to FIG. 4, whereby the sieve sections form a step in the middle area of the sieve, FIG. 6 a sieve device with several overlapping sieve sections that respectively comprise a curve, FIG. 7 a plan view in the direction of the powder transport on a sieve section, whereby the sieve section comprises raised edges on the sides, FIG. 8 a schematic depiction of a device for generative manufacture of components that are integrated into a sieve device according to FIG. 2.

Reference will first be made to drawing FIG. 8.

In FIG. 8 a device 1 is schematically shown for the manufacture of components from powdered solidifiable construction material 4 by means of successive solidification of individual layers 3, whereby the construction material 4 is melted by laser radiation 5 and after cooling agglutinates to a solid component. Such a device 1 comprises a coating device 6 for application of the powder layers 3 on a preferably height-adjustable carrier 7, a dosing device 8 for preparation of the construction material 4 for the coating device, an overflow container 9 for intake of construction material 4 not needed for the coating process, and a sieve device 10, which is configured according to the State of the Art according to FIG. 1, and according to the invention comprises characteristics that are depicted in the drawing FIGS. 2-7. According to the State of the Art, the sieve device 10 comprises a powder feed opening 11 through which excess construction material 4 coming from the overflow container 9 is added to the sieving process. The screening material consisting of grains of differing size falls on a sieve 12 of sieve device 10, whereby the sieve 12 is so configured that the screening material is carried with an evenly constant velocity across the sieve fabric. An oscillating drive 13 is provided for this purpose that sets the sieve 12 in motion so that the screening material is carried over the surface of sieve 12. A grain container 14 is installed under sieve 12 or the sieve fabric, which comprises a discharge opening 15 that can be connected directly or indirectly with a container of the dosing device, which is indicated by a powder conduit 16. It is also within the framework of the invention to provide a separate container under the grain discharge opening 15 that can be inserted as a dosage container into the dosage device 8.

The oversized grain, i.e. powder particles that cannot penetrate the mesh of the sieve, is directed to a powder discharge area 18 on the end of the sieve and is collected there in an oversized grain container.

According to the invention, the sieve 12 of the sieve device 10 is configured according to FIGS. 2-7. The sieve 12 can, for example, be curved in the direction of transport, whereby the construction material 4 to be sieved is first brought with an initial velocity across the surface of the sieve 12 and then the transport velocity of the powdered material 4 slows across the surface of the sieve 12 or is reduced to a lower velocity. This can be achieved, for example, in that the sieve 12 is curved in transport direction 20 as shown in FIG. 2. The surface of the sieve 12 in the area of a powder feed opening 11 comprises a greater incline than in the powder discharge area 18 of the sieve 12.

As shown in FIG. 2, the sieve 12 can comprise an even curve. It is also possible to construct the sieve 12 from several particularly angular or flexible adjacent sieve sections 12.1-12.4, as shown in drawings 3-6. In the exemplary embodiment shown in FIG. 3, the sieve 12 consists of a chain of four sieve sections 12.1-12.4, whereby each sieve section comprises, for example, a planar form. The sieve section 12.1 is steeper than the respective following sections 12.2, 12.3, and 12.4. In the exemplary embodiment shown in FIG. 4, four sieve sections 12.1-12.4 are also provided that overlap with them on the end edges 21 in transport direction 20 so that the construction material 4 that will be sieved is conveyed safely to the next sieve sections 12.2, 12.3, and 12.4.

For the exemplary embodiment shown in Fig. a step is provided in an area of the sieve 12, because the sieve section 12.2 comprises a slighter declination than the following sieve section 12.3 in the transport direction 20.

Such a step can naturally also be adjusted in the exemplary embodiment according to FIG. 3 or FIG. 6. The provision for individual sieve sections 12.1-12.4 (in FIG. 5) enables different inclinations of the sieve sections. In FIG. 6 sieve sections are provided to overlap with their lower edges 21, whereby the sieve sections 12.1-12.4 respectively comprise a curve in transport direction 20.

In FIG. 7 it can be seen that each sieve section 12.1-12.4 comprises edges raised at the sides, so that the construction material 4 to be sieved is conveyed in a channel.

An oscillating drive 13 is also indicated in the drawing and is configured so that it can be put into oscillating motion by means of drive elements 13' of the sieve 12 or the individual sieve sections 12.1-12.4.

REFERENCE NUMBER LIST

1. Device
2. Component
3. Layers
4. Construction material
5. Laser radiation
6. Coating device
7. Carrier
8. Dosing device
9. Overflow container
10. Sieve device
11. Powder feed opening
12. Sieve
13. Oscillating drive
13'. Drive elements
14. Coarse grain container
15. Grain discharge opening
16. Powder line
17. Powder discharge area
18. Oversized gain container
19. Transport direction
20'. Longitudinal direction
20. End edges/Lower edges

The invention claimed is:

1. A device for generative manufacture of components by sequential solidification of individual layers from powdered solidifiable construction material by exposure to radiation by means of sector by sector melting or fusing and binding the construction material, the device comprising:
    a coating device for application of powder layers on a carrier;
    an overflow container for intake of unused powdered construction material; and,
    a sieve device for sieving at least a portion of the unused powdered construction material, wherein the sieve device comprises one or more surfaces of different inclinations to reduce a transport velocity of the unused powdered construction material as the unused powdered construction material traverses the one or more surfaces of the sieve,
    wherein the surface of the sieve comprises a plurality of adjacent sections, and wherein at least two adjacent sections at least partially overlap.

2. The device of claim 1, further comprising a dosing device for preparation of the powdered construction material for the coater.

3. The device of claim 1, wherein the surface of the sieve device is curved.

4. The device of claim 3, wherein the surface of the sieve comprises a uniform curve.

5. The device of claim 1, wherein the surface of the sieve comprises a plurality of inclines.

6. The device of claim 5, wherein a first incline proximate a powder feed opening is greater than a second incline proximate a powder discharge area of the sieve.

7. The device of claim 1, wherein at least some of the plurality of adjacent sections comprise angular or articulated sections.

8. The device of claim 7, wherein at least some of the plurality of adjacent sections comprise distinct curves.

9. The device of claim 7, wherein at least some of the plurality of adjacent sections are adjustable in inclination.

10. The device of claim 7, wherein an angle between at least some of the plurality of adjacent sections is adjustable.

11. The device of claim 1, wherein the sieve comprises raised longitudinal side edges.

12. The device of claim 1, wherein the sieve comprises an oscillating drive.

13. The device of claim 1 further comprising a powder feed opening adjacent the sieve, wherein the powder feed opening is adjustable.

14. The device of claim 1, further comprising at least one grain container disposed under the sieve.

15. The device of claim 14, wherein an outlet of the at least one grain container is connected to a dosing container of the device.

* * * * *